(12) United States Patent
Stewart

(10) Patent No.: US 7,515,975 B2
(45) Date of Patent: Apr. 7, 2009

(54) TECHNIQUE FOR SWITCHING BETWEEN CONTROLLERS

(75) Inventor: Gregory E. Stewart, Vancouver (CA)

(73) Assignee: Honeywell Asca Inc., Ontario (CA)

( * ) Notice: Subject to any disclaimer, the term of this patent is extended or adjusted under 35 U.S.C. 154(b) by 420 days.

(21) Appl. No.: 11/444,850

(22) Filed: May 31, 2006

(65) Prior Publication Data

US 2007/0142932 A1    Jun. 21, 2007

Related U.S. Application Data

(60) Provisional application No. 60/750,739, filed on Dec. 15, 2005.

(51) Int. Cl.
| | |
|---|---|
| G05B 13/02 | (2006.01) |
| G05B 19/18 | (2006.01) |
| G05B 11/01 | (2006.01) |
| G06F 11/00 | (2006.01) |
| H01H 3/00 | (2006.01) |
| H01H 9/54 | (2006.01) |
| H01H 33/59 | (2006.01) |
| H01H 47/00 | (2006.01) |
| H01H 85/46 | (2006.01) |

(52) U.S. Cl. ............... 700/32; 700/4; 700/20; 700/21; 714/11; 307/139

(58) Field of Classification Search ........ 700/3–5, 700/20, 21, 29, 31, 32, 47, 49; 706/14, 23; 714/6, 11, 13, 15; 307/112, 139; 379/242, 379/258, 268, 269
See application file for complete search history.

(56) References Cited

U.S. PATENT DOCUMENTS 3,848,230 A * 11/1974 Rehm et al. ............ 340/825.21

4,248,040 A * 2/1981 Kast ....................... 60/39.27
4,347,564 A * 8/1982 Sugano et al. .................. 700/3

(Continued)

FOREIGN PATENT DOCUMENTS

JP    57057306 A  *  4/1982

(Continued)

OTHER PUBLICATIONS

Chaojun Zhou et al., Adaptive Switching Control Method and its Application to Tracking Control of a Robot, Indust Elect, IEEE, Aug. 1996, NY, US, vol. 1, p. 214-219, XP010203407.

(Continued)

*Primary Examiner*—Crystal J Barnes Bullock
(74) *Attorney, Agent, or Firm*—Cascio Schmoyer & Zervas

(57) ABSTRACT

A controller design for switching between m linear multivariable controllers each of whom stabilizes a linear plant has been presented. A Youla-Kucera factorization was exploited in the interest of obtaining a closed-loop system that is exponentially stable for any switching signal $\sigma(t)$ in the absence of plant model uncertainty. Robustness to practical model uncertainty was also considered and lower and upper bounds on the tolerable magnitude of unstructured additive plant uncertainty were presented. Numerical example demonstrated that the two controller degrees of freedom in the proposed controller design could be used to separately modify the closed-loop steady-state (with respect to $\sigma(t)$) performance and the switching transients.

19 Claims, 4 Drawing Sheets

U.S. PATENT DOCUMENTS

| | | | | |
|---|---|---|---|---|
| 4,562,528 | A | * | 12/1985 | Baba .............................. 700/4 |
| 4,707,778 | A | * | 11/1987 | Yamada et al. ................. 700/3 |
| 4,811,052 | A | * | 3/1989 | Yamakawa et al. ............ 399/77 |
| 5,504,670 | A | * | 4/1996 | Barth et al. .................... 700/5 |
| 5,539,669 | A | * | 7/1996 | Goeckner et al. ........... 700/286 |
| 5,754,021 | A | * | 5/1998 | Kojima ....................... 318/466 |
| 6,148,415 | A | * | 11/2000 | Kobayashi et al. ............ 714/15 |
| 6,618,631 | B1 | * | 9/2003 | Johnson et al. ............... 700/47 |
| 6,849,968 | B2 | * | 2/2005 | Park ........................... 307/112 |
| 7,061,196 | B2 | * | 6/2006 | Noro et al. .................. 318/443 |

FOREIGN PATENT DOCUMENTS

| | | | | |
|---|---|---|---|---|
| JP | 63042245 | A | * | 2/1988 |
| JP | 04041903 | A | * | 2/1992 |
| JP | 04180443 | A | * | 6/1992 |
| JP | 06036900 | A | * | 2/1994 |
| JP | 08195762 | A | * | 7/1996 |
| JP | 2000179804 | A | * | 6/2000 |
| JP | 2001241823 | A | * | 9/2001 |
| JP | 2005043928 | A | * | 2/2005 |

OTHER PUBLICATIONS

Dante C, Youla et al., Modern-Wiener-Hopf Design of Optimal Controllers—Part II: The Multivariable Case, IEEE Trans, Jun. 1976, vol. AC-21, No. 3, p. 319-338, XP002430782.

Nakano K. et al., A Design of Robust Self-Tuning GPC-Based PID Controllers, IEEE Industrial Electronics Society, NY, US, p. 285-290, XP010693527.

Zhai et al., Analysis and Design of Switched Normal Systems, Nonlinear Analysis, Pergamon Press, Oxford, GB, p. 2248-2259, XP005714138.

Dayawansa & Martin, "A converse Lyapunov theorem for a class of dynamical systems which undergo switching," IEEE Trans. Automat. Contr.,44(4):751-760, Apr. 1999.

Liberzon, et al., "Stability of switched linear systems: a lie-algebraic condition," Syst. and Contr. Lett., 37(3):117-122, Jun. 1999.

Youla et al. Modern Wiener-Hopf design of optimal controllers -part II: The multivariable case, IEEE Trans. Automat. Contr., 21(3):319-338, Jun. 1976.

Graebe & Ahlen, "Dynamic transfer among alternative controllers and its relation to antiwindup controller design," IEEE Trans. Contr. Syst. Technol., 4(1):92-99, Jan. 1996.

Turner & Walker, "Linear quadratic bumpless transfer," Automatica, 36:1089-1101, 2000.

Zaccarian & Teel, "The L2 (I2) bumpless transfer problem: Its definition and solution. In Proc. of IEEE Conference on Decision and Control," pp. 5505-5510, Bahamas, Dec. 2004.

Hespanha & Morse, Switching between stabilizing controllers, Automatica 38 (2002) 1905-1917.

* cited by examiner

TECHNIQUE FOR SWITCHING BETWEEN CONTROLLERS

REFERENCE TO RELATED APPLICATIONS

This application claims priority to U.S. Provisional application Ser. No. 60/750,739 filed on Dec. 15, 2005.

FIELD OF THE INVENTION

The prevent invention relates generally to control systems and, more particularly, to techniques for switching between online controllers that guarantees closed-loop stability in the absence or presence of plant model uncertainty and quantifies closed-loop transients that are induced by switching.

BACKGROUND OF THE INVENTION

In many industrial applications there is a need to switch between particular controllers, however, the techniques for switching are often ad hoc and frequently there are large transients induced by controller switching. In extreme cases, closed-loop instability can result. The situation is compounded as design of new systems becomes increasingly complex because of the reliance on high performance features requiring tight tolerances and more robustness to system variations. Current techniques for addressing the switching problem afford inadequate assurances of performance and stability; indeed, most are only tested by simulation. Moreover, these methods are generally based on highly mathematical designs which can be difficult to implement in industrial practice.

SUMMARY OF THE INVENTION

The present invention is based, in part, on the development of a simple controller re-configuration technique that enables switching between a plurality of m linear multivariable controllers each of which stabilizes a fixed linear multivariable plant. The inventive controller configuration is characterized by a number of features such as, for example: (i) exponential stability is guaranteed for arbitrary switching between controllers, (ii) a design degree of freedom is included for shaping the transients that follow a switch, (iii) lower and upper bounds may be computed on the robust stability of the system in the presence of realistic plant model uncertainty. With respect to the practical implementation of the results, each of the linear components of the proposed controller may be implemented in any realization as long as each contains no unstable internal modes. Only the input-output characteristics of each component are important.

In one embodiment, the invention is directed to switched control system, which is suitable for controlling a plant, which includes:

a plurality of sub-controllers wherein each sub-controller can individually stabilize the plant; and means for switching between the plurality of sub-controllers to connect one of the sub-controllers to be online and thereby control the plant and wherein the switched control system is closed-loop stable under arbitrary switching.

In another embodiment, the invention is directed to a method of operating a switched control system, which is stable for arbitrary switching signals and which includes a plurality of sub-controllers for controlling a plant by switching between the plurality of sub-controllers in response to an arbitrary signal, said method including the steps of:

(a) providing a plurality of sub-controllers each of which can individually stabilize the plant;

(b) factoring each of the sub-controllers into two or more blocks;

(c) implementing the plurality of sub-controllers in terms of the two or more blocks, in parallel and continuously wherein each sub-controller generates an output control signal such that arbitrary switching between each of the plurality of subcontrollers is permitted; and (d) selecting an output control signal from one of the sub-controllers to control the plant.

In a further embodiment, the invention is directed to a system suitable for controlling a plant which includes a plurality of sub-controllers each of which can individually stabilize the plant wherein the plurality of sub-controllers is represented by a model that is indicative of dynamics of the plurality of sub-controllers and wherein each of the sub-controllers are factored into two or more blocks, said system being configured to perform the steps of:

(a) implementing the plurality of sub-controllers in parallel and continuously wherein each sub-controller generates an output control signal such that arbitrary switching between each of the plurality of sub-controllers is permitted; and (b) selecting an output control signal from one of the sub-controllers to control the plant.

The simplicity of the mathematics required for the application of these results should make this technique attractive for the practical design of switched control systems. The invention can be applied to any set of alternative controllers from controllers that monitor and control simple batch processes to those involved in automating facilities with complex processes to those involved in controlling complex mechanical systems such as those found in aerospace or automotive applications.

DETAILED DESCRIPTION OF PREFERRED EMBODIMENTS

1. Introduction. The control scheme described herein may be implemented with a wide variety of systems, including acoustical, mechanical, chemical, and electrical systems, where there is a need for arbitrary switching between linear stabilizing controllers as in gain scheduling, adaptive control, and bumpless transfer. It is understood, that the while the invention is illustrated with specific examples in terms of continuous time multivariable switched control system, the control scheme is not meant to be so limited, and can be extended to discrete time switched control problems. The switched control system of the prevent invention employ a plurality of controllers which are preferably feedback time invariant controllers, such as proportional plus integral (PI) and proportional-integral-derivative feedback (PID) controllers, for example. It is understood that the invention is not limited in terms of the controller type and may be used with single variable or multivariable controllers of any complexity or dynamical order.

Figure 1A:
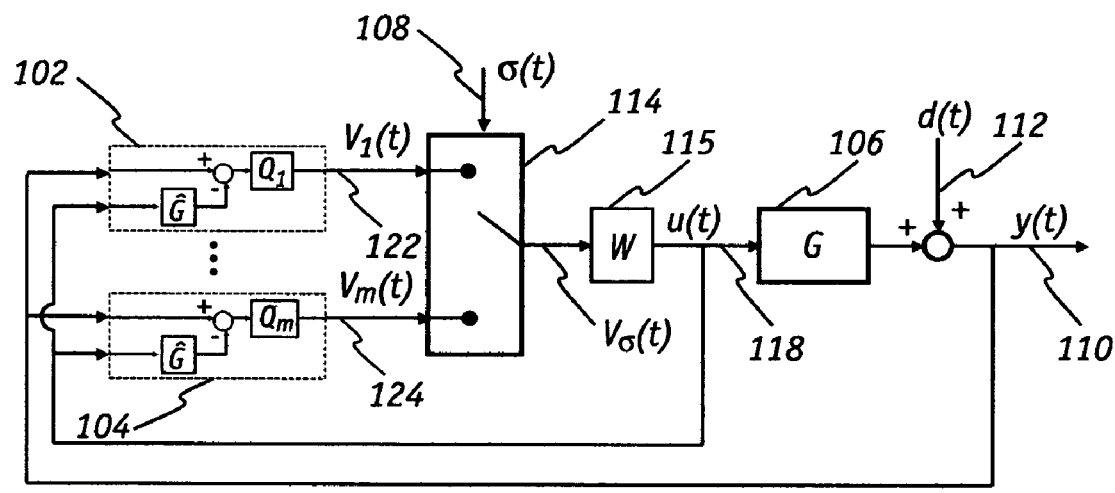
FIGS. 1A and 1B are switching control configurations.

As an illustration, the control scheme of the present invention is particularly suited for use in control engineering applications that require switching between a family of controllers $K_p(s)$ for $p \in \{1, \ldots, m\}$ 102, 104 with the objective of controlling a stable linear time-invariant plant G 106 as illustrated in FIG. 1A. Each controller can individually stabilize the stable linear plant. As described further herein, y(t) is the measured output signal 110 and d(t) is an additive output disturbance 112 at time t. The controller switching is performed with a memoryless nonlinear operator 114 that select one of the m possible control outputs $v_1(t), \ldots v_m(t)$ 122, 124 at each time t according to the exogenous switching signal $\sigma(t)$ 108 to select a signal $v_\sigma(t)$ which is then input into the post-switch block W 115 and output as an 'online' control signal u(t) 118 at each time t which is used to control the plant.

The invention is generally directed to techniques for switching between m linear multivariable controllers each of whom stabilizes a fixed linear multivariable plant. Such control systems arise in practical use for many reasons. A common example control systems where the exogenous signals (setpoints, disturbances) change their nature as a function of time. The application in some hybrid control strategies switches between a time-optimal tracking controller and a controller designed for disturbance rejection. Adaptive control for systems subject to non-stationary disturbances, such as ship stabilization, represents another example.

Probably the most obvious application is the general class of bumpless transfer problems which have broad application across many field of industrial control including process control, automotive, and aerospace applications. Several features of the bumpless transfer problem statement are relevant and will be considered throughout the current work. Many other piecewise-linear control systems fall into this category such as antiwindup, or logic based switching.

For illustrative purposes, the plant will be modeled by, $$y(t) = G \, o \, u(t) + d(t) \quad (1)$$

where u: $[0,\infty) \to R^N$ represents the inputs to the plant and y: $[0,\infty) \to R^M$ represents the outputs, G is a stable transfer matrix[1] and the signal d: $[0,\infty) \to R^M$ indicates an unmeasured disturbance at the output of the plant. (The notation of J. P. Hespanha and A. S. Morse, "Switching between stabilizing controllers," Automatica, 38(11):1905-1917, November 2002 is being used where for the transfer matrix G: $C \to C^{M \times N}$ and a piecewise continuous signal u: $[0,\infty) \to R^N$, then G o u denotes the convolution of the impulse response of G with u.)

Consider a set of linear, multivariable feedback controllers $K_p$ with $p \in \{1, \ldots, m\}$ where each controller individually stabilizes the plant G in (1) with u=$K_p$ o y. Then an exogenous switching signal $\sigma$: $[0,\infty) \to \{1, \ldots, m\}$ such that the value of $\sigma(t)$ specifies which of the controllers is online at any time t is considered. In describing the invention, three of the problems that must be addressed for any switched controller scheme to be used in practice will be considered. Stated qualitatively, the requirements include:

(1) In the absence of model uncertainty in (1) a switched control system shall be exponentially stable for any switching signal $\sigma(t)$.

(2) Upon switching to $\sigma(t)$=p the switched control system's closed-loop performance shall converge to that provided by the $p^{th}$ linear controller with u=$K_p$ o y without introducing undue transients into the closed-loop.

(3) In the presence of practical model uncertainty in (1), the closed-loop switched system shall remain stable for any switching signal $\sigma(t)$.

These problems have been studied in varying degrees in the literature. The question of exponential stability of a switched control system is a special case of a broader class of switching problems that have at their core a statement such as, $$\dot{x}(t) = A_\sigma x(t) \quad (2)$$

where the switching between a finite set of matrices $A_p$ for the index set $p \in \{1, \ldots, m\}$ is governed by the switching signal $\sigma(t)$. There are several versions of the problem, but the central issue is that the stability of each matrix $A_p$ is necessary but not sufficient to guarantee the stability of the system (2) for arbitrary switching signals $\sigma(t)$. It has been shown that the stability of (2) for arbitrary switching necessarily implies the existence of a common (not necessarily quadratic) Lyapunov function for all of the linear subsystems $\dot{x}(t) = A_p x(t)$ comprising (2). (See, W. P. Dayawansa and C. F. Martin, "A converse Lyapunov theorem for a class of dynamical systems which undergo switching," IEEE Trans. Automat. Contr., 44(4):751-760, April 1999.) A sufficient condition can be formulated as an LMI problem to find a common quadratic Lyapunov function which is equivalent to finding $Y=Y^T>0>$ satisfying $A_P^T Y + YA_P <0$ for p=1, ..., m. If such a Y can be found then (2) is stable under arbitrary switching $\sigma(t)$.

For the particular problem at hand—that posed by switching between linear controllers for a fixed plant, it has been noted that such a feedback configuration can lead to specific structures of the matrices $A_p$ in (2). Indeed, in J. P. Hespanha and A. S. Morse, "Switching between stabilizing controllers" Automatica, 38(11):1905-1917, November 2002, the authors proposed a switched controller of the form, $$l(t) = y(t) - \hat{G} \, o \, u(t)$$

$$u(t) = Q_\sigma \, o \, l(t) \quad (3)$$

where each linear transfer matrix $Q_p$ is stable for $p \in \{1, \ldots, m\}$. Note that for a fixed switching signal $\sigma(t)$=p, then (3) is equivalent to u=$K_p$ o y where $K_p(s) = (I + Q_p(s)\hat{G}(s))^{-1} Q_p(s)$, which is familiar as the standard Youla-Kucera parametrization of all stabilizing controllers $K_p$ for a stable plant $\hat{G}$. It is then shown in that if the internal model $\hat{G}$ is equivalent to the plant G in (1) then a state-space realization for the $Q_p$ always exists such that, for certain state 'reset maps' that initialize the internal state of the $Q_p$ at the switching times of $\sigma(t)$, the subsystems in (1), (3) have a common quadratic Lyapunov function (CQLF), and thus (1), (3) form an exponentially stable closed-loop system for arbitrary switching signal $\sigma$. As demonstrated below, the controller structure of the present invention also uses the Youla-Kucera factorization, but its configuration differs in such a way as to alleviate the need of imposing any constraints on the realization of the components of the switched controller.

The second problem above is related to the steady-state and transient performance of the switched control system and is stated in terms that are closely related to standard bumpless transfer. In bumpless transfer problems, the goal is to switch between m controllers u(t)=$K_p$ o y(t) such that the actuator signal u(t) is continuous at the switching times of $\sigma(t)$ and does not induce excessive transients into the closed-loop. A common approach, for example, is to modify the input signal to each of the offline controllers via a new controller as follows, $$\begin{bmatrix} l_1(t) \\ \vdots \\ l_m(t) \end{bmatrix} = \begin{bmatrix} y(t) + C_1 \cdot (v_1(t) - u(t)) \\ \vdots \\ y(t) + C_m \cdot (v_m(t) - u(t)) \end{bmatrix}, \begin{bmatrix} v_1(t) \\ \vdots \\ v_m(t) \end{bmatrix} = \begin{bmatrix} K_1 \cdot l_1(t) \\ \vdots \\ K_m \cdot l_m(t) \end{bmatrix} \quad (4)$$

and the controller switching is performed via selecting the appropriate signal, $$u(t) = v_\sigma(t) \quad (5)$$

The blocks $C_p(s)$ in (4) are typically designed as controllers to drive an offline signal $v_p(t)$ to converge to the online signal $u(t)$ as closely as possible, such that when a controller switches online the resulting transient effects will be mitigated. Following a switch of $\sigma(t)=p$, note that $u(t)=v_p(t)$ and once the switching transients have died out, the online controller is given by $u(t)=K_p \circ y(t)$ as desired. However, typically no stability guarantees are sought or given for arbitrary switching signals $\sigma(t)$.

The third problem above concerns the robust stability of a switched control system. The robustness of a switched control system with respect to uncertainty in the plant model can be a difficult question. Certain of the results for switched control systems have an inherent robustness and the existence of a common quadratic Lyapunov function for each of the linear subsystems $\dot{x}(t)=A_p x(t)$ comprising (2) is robust to small perturbations in the elements of each $A_p$ matrix. The proposed controller configuration in J. P. Hespanha and A. S. Morse is stated as maintaining its exponential stability under small perturbations to the dynamics of the system. Robustness results for a switching signal restricted to finitely many switches in finite time is addressed through an LMI construction in S. Pettersson and B. Lennartson, "Stability and robustness for hybrid systems," In Proc. of IEEE Conference on Decision and Control, pages 1202-1207, Kobe, Japan, December 1996.

Since in general, there exist combinations of stable matrices $A_p$ and switching signals $\sigma(t)$ that lead to a non-exponentially stable system (2), then many of the results obtained for the stability of switched system place requirements on the structure of the matrices $A_p$. At the same time, all practical plant models contain uncertainty and if the system (2) arises from a feedback controller connected to a real plant, then this model uncertainty may change the structure of the matrices $A_p$ rendering the some of the stability results inapplicable.

For example, the work in Liberzon, et al., "Stability of switched linear systems: a lie-algebraic condition," Syst. and Contr. Lett., 37(3):117-122, June 1999, proves that the system (2) is globally uniformly exponentially stable if the family of matrices $\{A_p: p=1, \ldots, m\}$ generate a solvable Lie algebra. The solvability of the Lie algebra may be interpreted as the existence of a matrix T such that each matrix $TA_pT^1$ is upper-triangular. Perturbations on the matrices $A_p$ can result in the family no longer having this property.

The controller structure of the present invention obtains many of its properties due to the exploiting the analogous block-upper-triangular structure for each matrix $A_p$ in (2). However, it will be shown that in contrast to the structural result in Liberzon, et al., standard plant model uncertainty in (1) cannot turn a zero element to a nonzero element and thus the block-upper-triangular structure is preserved.

The robust stability of a switched control system with respect to a standard model uncertainty—where the plant model's transfer matrix is perturbed by a stable unstructured transfer matrix of bounded $H_\infty$ norm is considered. The application of the small gain theorem then requires the use of induced norms on the switched system. While the computation of the $L_2$-induced norm of a switched system is generally difficult, the inventive controller structure provides a straightforward framework for robust stability analysis of the arbitrarily switched system. Lower and upper bounds on the robust stability margin that require only to compute $H_\infty$-norms of stable LTI transfer matrices are presented which makes the robust stability analysis accessible to a wide range of control practitioners.

2. Controller Design. A feedback controller design for switching between m different linear stabilizing feedback controllers is described and its properties in terms of closed-loop exponential stability, performance, and robust stability to practical model uncertainty analyzed. It will be shown that with the inventive switched controller structure, the closed-loop system is exponentially stable for any switching signal $\sigma(t)$; moreover, this result is independent of the controller's realization. In illustrating the uniqueness of the invention, the inventive scheme's two-degrees-of-freedom and relation to closed-loop steady-state and transient performance with respect to switching signal $\sigma(t)$ will be presented. Furthermore, lower and upper bounds on the magnitude $\gamma$ of unstructured additive model uncertainty such that the closed-loop system remains $L_2$ stable for all stable plants $G=\hat{G}+\Delta$ with $\|\Delta\|_{H_\infty} < \gamma$ and arbitrary switching signal $\sigma(t)$ will be demonstrated. As will be apparent, these results apply to switching between any number of multivariable controllers with no restrictions on number of modes, states, inputs or outputs.

In order to control the stable multivariable plant (1) and allow switching between any one of m stabilizing multivariable feedback controllers, we propose the following controller implementation, where m 'candidate' signals are created in parallel, $$l(t) = y(t) - \hat{G} \circ u(t), \begin{bmatrix} v_1(t) \\ \vdots \\ v_m(t) \end{bmatrix} = \begin{bmatrix} R_1 \\ \vdots \\ R_m \end{bmatrix} \circ l(t) \quad (6)$$

followed by generation of the control signal by switching between the m output signals of (6) and inputting the resulting signal through a stable post-switch transfer matrix, $$u(t) = W \circ v_\sigma(t) \quad (7)$$

where the controller switching is achieved by selecting which of the signals $v_1(t), \ldots, v_m(t)$ is used for the online signal $u(t)$ in (7) at any given time $t>0$. It is evident that the signal $v_\sigma(t)$ in (7) will generally have jump discontinuities at the switching times of $\sigma$. The signal $u(t)$ may also have jump discontinuities if the transfer matrix $W(s)$ is not strictly proper and has a direct feedthrough term.

As implied above, $R_p$ for $p \in \{1, \ldots, m\}$ and W are linear time invariant systems. The block $\hat{G}$ in (6) is interpreted as the controller's internal model of the plant G in (1) and is a familiar component of the Youla-Kucera parameterization or internal model control. The main difference between the controller proposed in (6), (7) and that in J. P. Hespanha and A. S. Morse can be observed by comparing with (3), where the same creation of signal $l(t)$ from the internal model is achieved but the application of the linear controller transfer matrices in (6), (7) is applied in two steps—pre-switch and post-switch. The switching in (3) is achieved by changing the gains in the transfer function $Q_\sigma$, while the switched controller in (6), (7) maintains a constant structure of the transfer matrix components and switches only the input signal $v_\sigma(t)$ in (7).

Engineering properties of the switched feedback system (1), (6), (7) with respect to nominal stability, nominal performance, and robust stability are described in Subsections 2.1, 2.2, and 2.3 respectively.

2.1 Exponential Stability of the Nominal System

Two different demonstrations of the exponential stability of the switched feedback control system in (1), (6), (7) are provided. The first approach uses a Youla-Kucera style argument and the input-output properties of each of the components. The second approach demonstrates that a common quadratic Lyapunov function exists for each of the m subsystems for any internally stable realization of the controller components in (6), (7) and the plant in (1).

The first benefit of the inventive switched control approach in (6), (7) is stated as the first result as follows:

Theorem 1 If the LTI components $G, W, R_1, \ldots, R_m$ are all stable and $\hat{G} = G$ in (6) then the switched feedback control system (1), (6), (7) is globally uniformly exponentially stable.

It can be shown that the result in Theorem 1 holds by using an argument similar to those used when proving stability using the Youla-Kucera parameterization. See, M. Morari and E. Zafiriou, Robust Process Control, Prentice Hall, New Jersey, 1989 and D. C. Youla, H. A. Jabr, and J. J. Bongiorno Jr. Modern Wiener-Hopf design of optimal controllers—part II: The multivariable case, IEEE Trans. Automat. Contr., 21(3): 319-338, June 1976. The closed-loop switched system (1), (6), (7), is given by $$\begin{bmatrix} v_1(t) \\ \vdots \\ v_m(t) \end{bmatrix} = \begin{bmatrix} R_1 \\ \vdots \\ R_m \end{bmatrix} \circ [G \circ u(t) - \hat{G} \circ u(t) + d(t)], \; u(t) = W \circ v_\sigma(t) \quad (8)$$

then with perfect model information such that the response of $\hat{G}$ in (6) is equivalent to the response of G in (1), one can write the closed-loop (8) as the open-loop relation, $$\begin{bmatrix} v_1(t) \\ \vdots \\ v_m(t) \end{bmatrix} = \begin{bmatrix} R_1 \\ \vdots \\ R_m \end{bmatrix} \cdot d'(t) \quad (9)$$

where the exogenous disturbance d'(t) in (9) is related to the exogenous disturbance d(t) in (1), (8) through a term containing an exponentially decaying difference between the initial states of G and $\hat{G}$ that is independent of switching signal σ(t). (Quantitatively, if $\hat{G}$ and G have state space realizations related by a similarity transform $\{A_{\hat{g}}B_{\hat{g}}C_{\hat{g}}D_{\hat{g}}\} = \{SA_gS^{-1}, SB_g, C_gS^{-1}, D_g\}$ then the disturbances in (1) and (9) may be written down as, $d'(t) = d(t) + C_g e^{A_g t}(x_g(0) - S^{-1}x_{\hat{g}}(0))$, $t \geq 0$ where $x_g(0)$ is the initial state of the plant G in (1) for t=0 and is not necessarily equal to the initial state $x_{\hat{g}}(0)$ of the internal plant model $\hat{G}$ contained in the controller (6). This term decays exponentially for any invertible similarity transform matrix S.) For most practical purposes the transient difference between d(t) and d'(t) can be ignored for t>>0.

Following (9), the closed-loop signals y(t) and u(t) are equivalently given by a convolution of $v_\sigma(t)$ with stable transfer matrices, $$y(t) = G \circ W \circ v_\sigma(t) + d(t), \; u(t) = W \circ v_\sigma(t) \quad (10)$$

and thus (9), (10) both comprise exponentially stable systems. Since the development in (8)-(10) relied only on the input-output properties of each of the components $G, \hat{G}, W$ and $R_1, \ldots, R_m$ in (1), (6), (7), it can be said that the result is independent of the realization of each of the components.

An alternative proof of the exponential stability of (1), (6), (7) can be obtained by demonstrating that a common quadratic Lyapunov function (CQLF) exists for each of the subsystems $p \in \{1, \ldots, m\}$ in (1), (6), (7) independent of their realization.

Let one state-space realization of transfer matrices W in (7) and each $R_p$ in (6) for $p \in \{1, \ldots, m\}$ be given by state space matrices $\{A_w, B_w, C_w, D_w\}$ and $\{A_{Rp}, B_{Rp}, C_{Rp}, D_{Rp}\}$ and internal states $x_w(t), x_{Rp}(t)$ respectively. Let the plant G in (1) and the internal plant model $\hat{G}$ be realized by state space matrices $\{A_gB_gC_gD_g\}$ and $\{A_{\hat{g}}B_{\hat{g}}C_{\hat{g}}D_{\hat{g}}\}$ with respective internal states $x_g(t)$ and $x_{\hat{g}}(t)$. Combining the states and signals of each of the controllers in (6), (7), along with the plant in (1) as $X(t)^T := [x_{\hat{g}}(t)^T, x_g(t)^T, x_w(t)^T, x_{R1}(t)^T, \ldots, x_{Rm}(t)^T]^T$ and $Y(t)^T := [y(t)^T, u(t)^T, v_1(t)^T, \ldots, V_m(t)^T]^T$ then the switched closed-loop system in (1), (6), (7) has the following state-space matrix structure, $$\begin{bmatrix} \dot{X}(t) \\ Y(t) \end{bmatrix} = \begin{bmatrix} \tilde{A}_\sigma & \tilde{B}_\sigma \\ \tilde{C}_\sigma & \tilde{D}_\sigma \end{bmatrix} \begin{bmatrix} X(t) \\ d'(t) \end{bmatrix} \quad (11)$$

For the switched feedback control system in (1), (6), (7), the state space matrices in (11) are given for each $p \in \{1, \ldots, m\}$ by, $$\tilde{A}_p = \begin{bmatrix} A_{\hat{g}} & 0 & B_{\hat{g}}C_\omega & 0 & \ldots & 0 & B_{\hat{g}}D_w C_{R_p} & 0 & \ldots & 0 \\ & A_g & B_g C_\omega & 0 & \ldots & 0 & B_g D_w C_{R_p} & 0 & \ldots & 0 \\ & & A_\omega & 0 & \ldots & 0 & B_w C_{R_p} & 0 & \ldots & 0 \\ & & & A_{R_1} & 0 & 0 & 0 & \ldots & 0 \\ & & & & A_{R_2} & & & & & \\ & & & & & \ddots & 0 & & & \\ & & & & & & A_{R_p} & & & \\ & & & & & & & \ddots & & \\ & & & & & & & & \ddots & \\ & & & & & & & & & A_{R_m} \end{bmatrix}, \quad (12)$$

$$\tilde{B}_p = \begin{bmatrix} B_{\hat{g}} D_w D_{R_p} \\ B_g D_w D_{R_p} \\ B_w D_{R_p} \\ B_{R_1} \\ B_{R_2} \\ \vdots \\ B_{R_m} \end{bmatrix}$$

-continued $$\tilde{C}_p = \begin{bmatrix} C_{\hat{g}} & 0 & D_{\hat{g}}C_\omega & 0 & \ldots & 0 & D_{\hat{g}}D_wC_{R_p} & 0 & \ldots & 0 \\ & C_g & D_gC_\omega & 0 & \ldots & 0 & D_gD_wC_{R_p} & 0 & \ldots & 0 \\ & & C_\omega & 0 & \ldots & 0 & D_wC_{R_p} & 0 & \ldots & 0 \\ & & & C_{R_1} & & 0 & 0 & 0 & \ldots & 0 \\ & & & & C_{R_2} & & & & & \\ & & & & & \ddots & & & & \\ & & & & & & C_{R_p} & & & \\ & & & & & & & \ddots & & \\ & & & & & & & & \ddots & \\ & & & & & & & & & C_{R_m} \end{bmatrix},$$

$$\tilde{D}_p = \begin{bmatrix} D_{\hat{g}}D_wD_p \\ 1+D_gD_wD_p \\ D_wD_p \\ D_{R_1} \\ D_{R_2} \\ \vdots \\ D_{R_m} \end{bmatrix}$$

where the matrix elements that change with changing index p are written in bold face. In the $\tilde{A}_p$ and $\mathcal{C}_p$ matrices only the $(1, p+3)^{th}$, $(2, p+3)^{th}$ and $(3, p+3)^{th}$ blocks are nonzero and a function of the controller mode. The fact that $\tilde{A}_p$ is block-upper-triangular will be important in the proof of exponential stability below.

Before analyzing the stability of the state-space system in (11), (12), a property of a more general class of matrices to which the matrices $\tilde{A}_p$ in (12) belong will be first described. Consider a set of m block upper triangular real matrices with, $$\tilde{A}_p = \begin{bmatrix} A_{11} & A_{12}(p) & A_{13}(p) & \ldots & A_{1n}(p) \\ & A_{22} & A_{23}(p) & & \vdots \\ & & A_{33} & \ddots & \vdots \\ & & & \ddots & A_{n-1,n}(p) \\ & & & & A_{nn} \end{bmatrix}, p \in \{1, \ldots, m\} \quad (13)$$

where each matrix $\tilde{A}_p$ is of size $\tilde{n} \times \tilde{n}$ with $\tilde{n}=\Sigma_{j=1}^n n_j$, the diagonal block elements $A_{jj} \in R^{nj \times nj}$ for $j=1, \ldots, n$ do not depend on the index p, while the block elements $A_{ij}(p) \in R^{ni \times nj}$ above the main diagonal may take different values for each $p \in \{1, \ldots, m\}$.

It is straightforward to show that a system $\dot{X}(t)=\tilde{A}_\sigma X(t)$ with state $X=[x_1^T, \ldots, x_n^T]^T$, and $\tilde{A}_p$ in (13) is exponentially stable for any switching signal $\sigma(t)$ if each block $A_{jj}$ is stable since each component of the state $\dot{x}_i=A_{ii}x_i+\Sigma_{j=i+1}^n{}^n(\sigma)x_j$, then stability of the $i^{th}$ state component $x_i$ requires stable $x_j$ for $j>i$ and $\bar{\sigma}(A_{ij}(p))<\infty$ for all $p \in \{1, \ldots, m\}$.

In addition, the following Theorem will show there also exists a common quadratic Lyapunov function for the matrices $\tilde{A}_p$ in (13) a feature that is sufficient for the global uniform exponential stability of a switched system $\dot{x}(t)=\tilde{A}_\sigma x(t)$.

Theorem 2 Given block upper triangular matrices $\tilde{A}_p$ for $p \in \{1, \ldots, m\}$ in (13) if each matrix $A_{jj}$ is stable (eigenvalues have negative real part) for $j \in \{1, \ldots, n\}$, $\bar{\sigma}(A_{ij}(p))<\infty$ for $i<j$ and $A_{ij}(p)=0$ for $i>j$ and $p \in \{1, \ldots, m\}$, then there exists a matrix $P=P^T>0$ such that $$-\tilde{A}_p^T P - P\tilde{A}_p > 0, \forall p \in \{1, \ldots, m\} \quad (14)$$

and $V(X):=X^T PX$ is a Lyapunov function for each of the systems $\dot{X}=\tilde{A}_p X$, $p \in \{1, \ldots m\}$.

Proof of Theorem 2 is provided herein.

Theorem 2 provides an exponential stability result for realizations of the components in (1), (6) and (7) that lead to upper triangular matrices $\tilde{A}_p$ of the class defined in (13). The following Corollary illustrates that this result applies to a family of realizations if alternatives to a given state-space realization $\{A, B, C, D\}$ defined via the similarity transformation $\{A', B',C',D'\}=\{SAS^{-1}, SB, CS^{-1}, D\}$ for some invertible matrix S are considered; it is evident that Theorem 2 has the following applicability to the problem at hand:

Corollary 3 The matrices $\tilde{A}_p$ for $p \in \{1, \ldots, m\}$ in (12) belong to the class of matrices defined in (13) for any stabilizable and detectable state-space realization of the transfer matrix components G, W, Ĝ, $R_1, \ldots, R_m$ of the switched control system in (1), (6) and (7).

Proof Let W in (7) be realized by $\{A'_w, B'_w C'_w, D'_w\}=\{S_w A_w, S_w^{-1}, S_w B_w, C_w S_w^{-1}, D_w\}$ for some invertible matrix $S_w$. Apply analogous transformations to the state-space representations for G, Ĝ, $R_1, \ldots, R_m$. Then it is found that $\tilde{A}_p$ in (12) remains in the class in (13) for invertible matrices $S_w, S_{\hat{g}}, S_g, S_{r1}, \ldots, S_{rm}$.

Thus a common quadratic Lyapunov function exists for each of the m closed-loop subsystems in (1), (6) and (7) independent of the realization of the components. The difference between this result and the related Youla-Kucera based but realization-dependent result in J. P. Hespanha and A. S. Morse can be seen by comparing the implementation of the controller in (3) to that proposed in (6), (7). The switching in (3) is achieved by swapping controller gains that are applied to a common state (which is either maintained as continuous or set to zero at the switching times of $\sigma(t)$). Whereas the switching in (6), (7) is performed on the signal $v_o$ and does not directly affect the internal state of any of the controller's components—each linear component operates independently, subjected to its respective. (possibly jump discontinuous) input signal. The use of a parallel bank of controllers, combined with the Youla-Kucera parametrization led to the particular structure of the matrices in (12) that admits a CQLF for any realization of the controllers' components in (6), (7).

Note that the discussion of the exponential stability of (1), (6), (7) in this subsection relied on the controller's internal model Ĝ in (6) matching the plant G in (1) perfectly. Thus these can be interpreted as a nominal stability result. The impact of model uncertainty is analyzed in Subsection 2.3 below.

2.2 Nominal Performance

Next two important aspects of nominal performance of the switched control system in (1), (6), (7) are considered where it is assumed there is no uncertainty in the internal model Ĝ. First the steady-state performance (steady-state with respect to switching signal $\sigma(t)$) of the switched system is treated, and second the closed-loop transient behavior following the switching times of $\sigma(t)$ is analyzed.

First the notion of an unswitched signal as the closed-loop signals y and u in (1), (6), (7) that would occur if the switching signal was held constant $\sigma(t)=p$ for all $t>0$ is explicitly defined. These will be denoted, $$\hat{y}(t; p) := y(t)|_{\sigma(t)=p, t>0} = (I + G \circ W \circ R_p) \circ d'(t)$$

$$\hat{u}(t; p) := u(t)|_{\sigma(t)=p, t>0} = (W \circ R_p) \circ d'(t) \qquad (15)$$

The nominal unswitched closed-loop performance in (15) can be made equivalent to that of any given stabilizing feedback controller $K_p$ by designing the stable controller transfer matrices in (6), (7) such that, $$W(s) R_p(s) = (I - K_p(s) G(s))^{-1} K_p(s) \qquad (16)$$

and is familiar in internal model control as the Youla-Kucera parametrization of all stabilizing feedback controllers for the stable plant G. Thus the proposed controller formulation in (6), (7) does not limit the achievable unswitched performance. Substitution of (16) into (15) shows that the unswitched closed-loop performance in (15) is given by the closed-loop sensitivity and control sensitivity transfer matrices respectively.

Next consider the transient effects introduced into the closed-loop switched system (1), (6), (7) by the act of switching $\sigma(t)$. If G, W, and each $R_p$ for $p=\{1, \ldots, m\}$ are all stable, internal model $\hat{G}=G$, then the online closed-loop trajectories y(t), u(t) in (1), (6), (7) converge exponentially to the unswitched closed-loop trajectories $\hat{y}(t; p)$, $\hat{u}(t; p)$ in (15) according to the dynamics of G o W and W respectively.

At all times t>0 the difference between the closed-loop signals y and u and their unswitched performance of the $p^{th}$ controller is given by, $$y(t) - \hat{y}(t; p) = G \circ W \circ [v_\sigma(t) - v_p(t)]$$

$$u(t) - \hat{u}(t; p) = W \circ [v_\sigma(t) - v_p(t)] \qquad (17)$$

where the signals $v_p(t)$ are defined in (9). If the switching signal $\sigma(t)=p$ for $t>t_s$, then $v_\sigma(t)=v_p(t)$ and (17) becomes, $$y(t) - \hat{y}(t; p) = C_{gw} e^{A_{gw}(t-t_s)} [x_{gw}(t_s) - \hat{x}_{gw}(t_s; p)]$$

$$u(t) - \hat{u}(t; p) = C_w e^{A_w(t-t_s)} [x_w(t_s) - \hat{x}_w(t_s; p)] \qquad (18)$$

where the matrices $\{A_{gw}, B_{gw}, C_{gw}, D_{gw}\}$ represent a state-space realization of the linear transfer matrix GW $\{A_w, B_w, C_w, D_w\}$ are a state-space realization of W. The states $x_{gw}(t_s)$ and $\hat{x}_{gw}(t_s; p)$ may be computed from the relations $\dot{x}_{gw}(t) = A_{gw} x_{gw}(t) + B_{gw} v_\sigma(t)$ and $\dot{\hat{x}}_{gw}(t; p) = A_{gw} \hat{x}_{gw}(t; p) + B_{gw\,p}(t)$ respectively. A similar definition holds for the states of W given by states $x_w(t)$ and $\hat{x}_w(t; p)$ in (18). The closed-loop switching transient result in (18) can be verified directly from the state-space matrix description in (12).

By inspection of (17) and (18) one may observe a tradeoff in the design of the linear post-switch block W in (7) in terms of the transient signals. Designing the post-switch block $W(s) \approx I$ in would produce small transients in the control signal observed as a fast convergence of the online signal to the unswitched signal $u(t) \rightarrow \hat{u}(t; p)$, while a value of $W(s) \approx G(s)^{-1}$ would favor small energy in the transient plant output observed as a fast convergence of $y(t) \rightarrow \hat{y}(t; p)$ in (18).

It is useful to note that the unswitched behavior of online signals y and u is a function of W o $R_p$ in (15). On the other hand the post-switch block W appears alone in the expression defining transient behavior of y and u in (18). This separation indicates that the steady-state and transient performance may be specified separately when designing the switched controller in (6), (7).

The standard bumpless transfer problem can be addressed through an open-loop design of the stable transfer matrix W(s) in (7). The central performance goal for the bumpless transfer problem is traditionally stated as requiring the online control signal u(t) to be continuous at all switching times of $\sigma(t)$. S. F. Graebe and A. L. B. Ahlen, "Dynamic transfer among alternative controllers and its relation to antiwindup controller design," IEEE Trans. Contr. Syst. Technol., 4(1): 92-99, January 1996. If one uses the proposed controller configuration (6), (7) then continuity in u(t) with respect to steps in $v_o(t)$ would be satisfied by simply constraig post-switch block W(s) to be strictly proper (i.e., no direct feedthrough term). The traditional bumpless transfer problem statement has been extended to include consideration of the induced closed-loop transient signals—a linear quadratic cost function in M. C. Turner and D. J. Walker, "Linear quadratic bumpless transfer," Automatica, 36:1089-1101, 2000, and an $L_2$ cost function in L. Zaccarian and A. R. Teel, "The L2 (12) bumpless transfer problem: Its definition and solution. In Proc. of IEEE Conference on Decision and Control," pages 5505-5510, Bahamas, December 2004. For the proposed controller structure in (6), (7), shaping of the transient signals would then be a matter of designing a stable transfer matrix W(s) for the open-loop system in (18) according to the relevant performance requirement.

It is also worth pointing out that the bumpless transfer controller structure in (4), (5) can be made equivalent to the controller structure of (6), (7) by selecting $C_p(s) = \hat{G}(s)$ for all subcontrollers $p=1, \ldots, m$ in (4). Then (4), (5) is equivalent to the proposed structure in (6), (7) with the parameters (s)=I and $R_p(s) = (I - K_p(s) \hat{G}(s))^{-1} K_p(s)$. So then, by selecting the parameters $C_p$ in this way, the closed-loop switched system (1), (4), (5) is exponentially stable for arbitrary switching signals $\sigma$. Furthermore, the structure in (4), (5) permits exponential stability to be achieved without needing to know the values of the transfer matrices $K_p(s)$ which denote the linear controllers in (4). This surprising result means that one needs only to know that each $K_p(s)$ stabilizes $\hat{G}(s)$ and exponential stability is achieved by using $\hat{G}(s)$ in the place of each $C_p(s)$—no further knowledge of the input-output behavior of $K_p(s)$ is required.

Figure 1B:
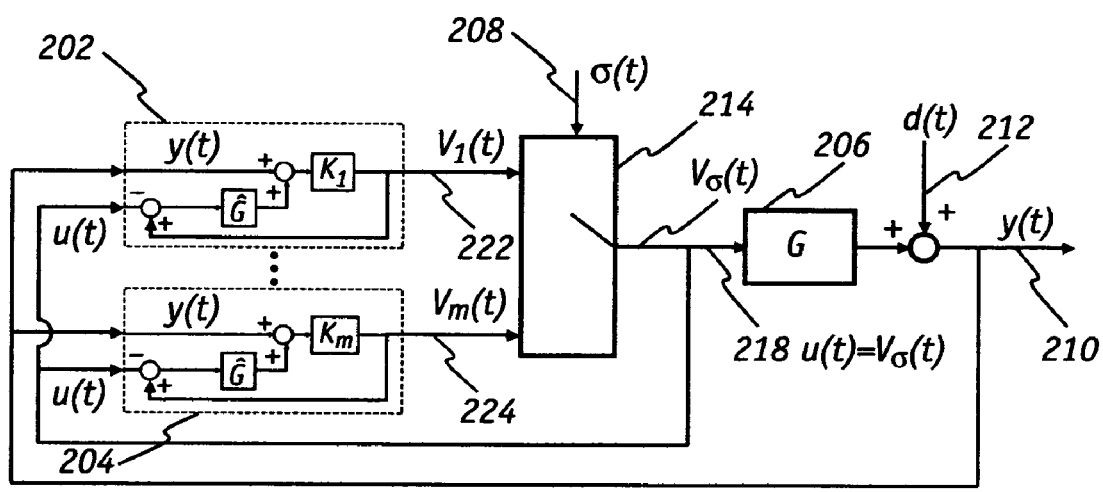
Figure 2A:
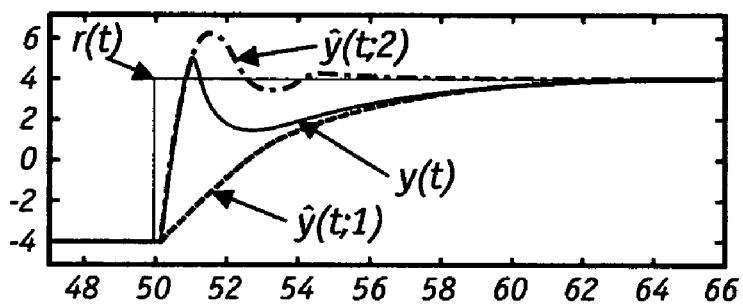
FIGS. 2A to 2E illustrate the effects of an all-pass post-switch filter on the switching of PI controllers.
Figure 2B:
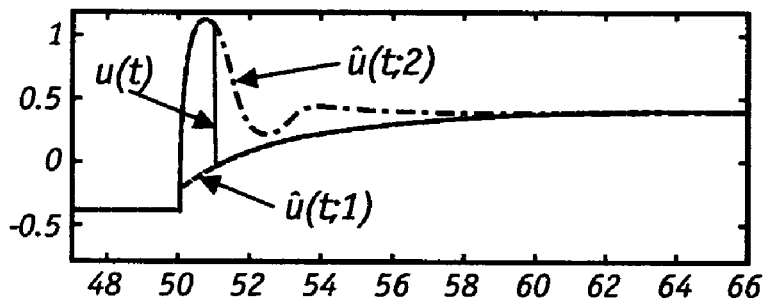
Figure 2C:
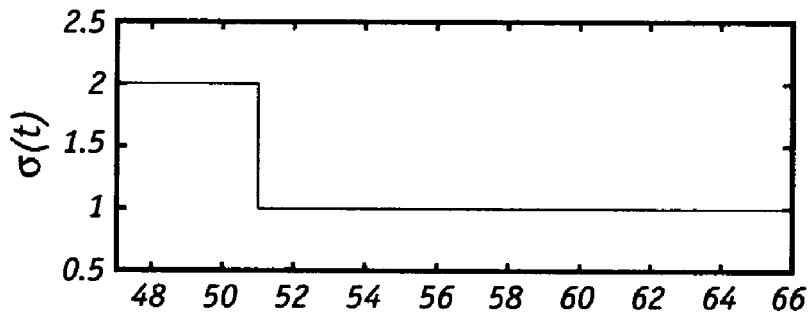
Figure 2D:
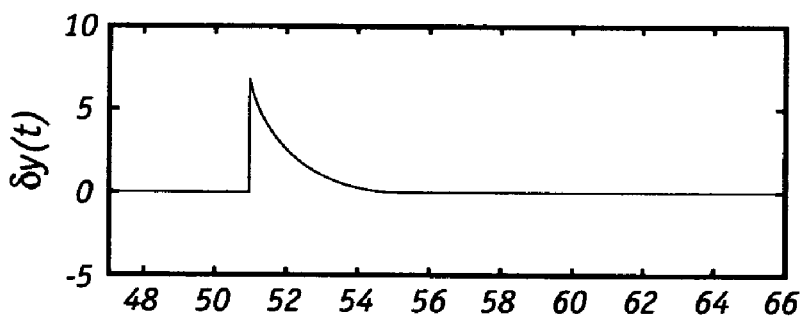
Figure 2E:
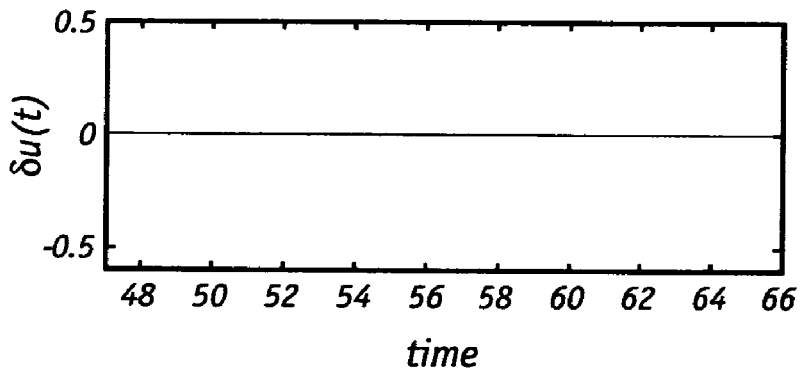
Figure 3A:
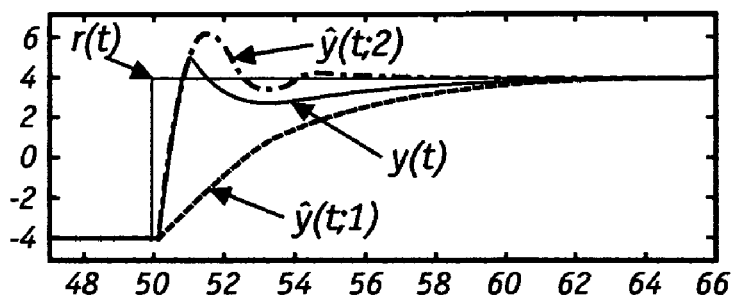
FIGS. 3A to 3E illustrate the effects of a low-pass post-switch filter on the switching of PI controllers.
Figure 3B:
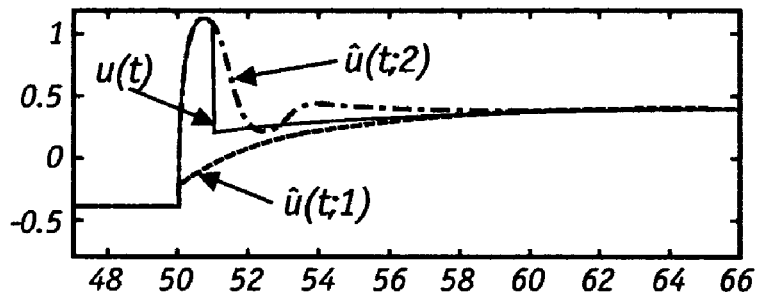
Figure 3C:
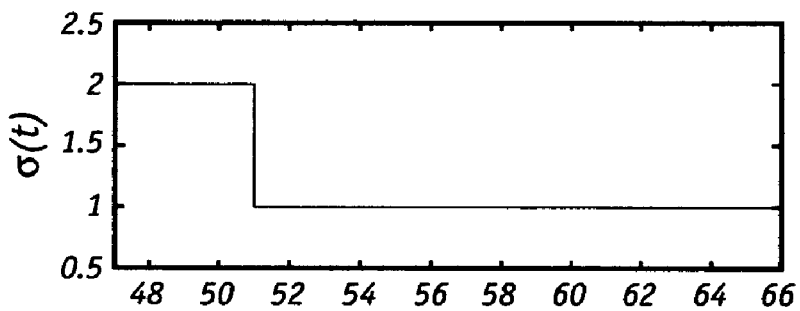
Figure 3D:
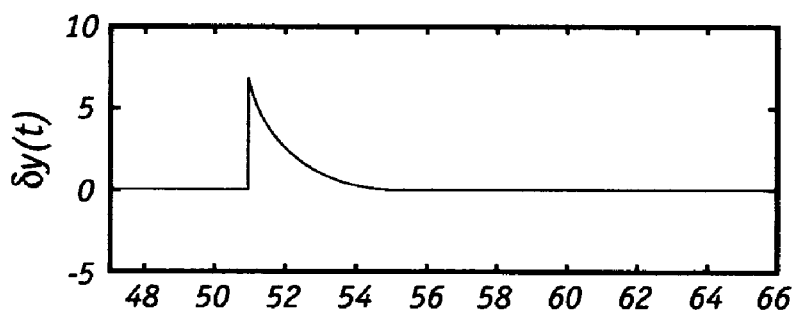
Figure 3E:
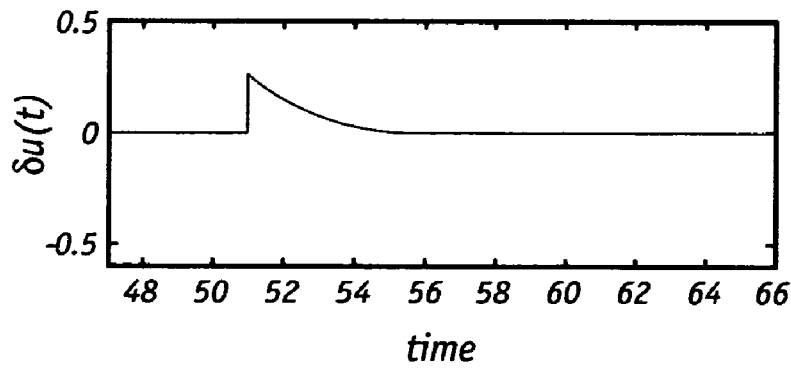
Figure 4A:
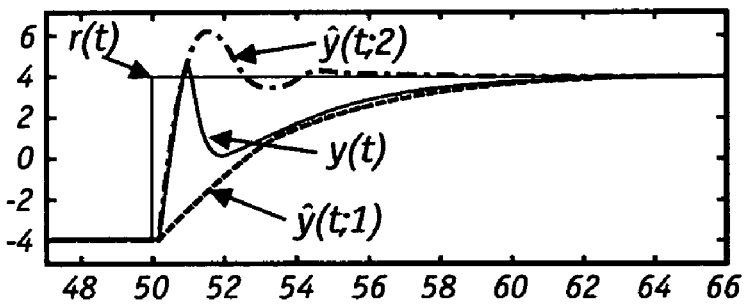
FIGS. 4A to 4E illustrate the effects of a high-pass post-switch filter on the switching of PI controllers.
Figure 4B:
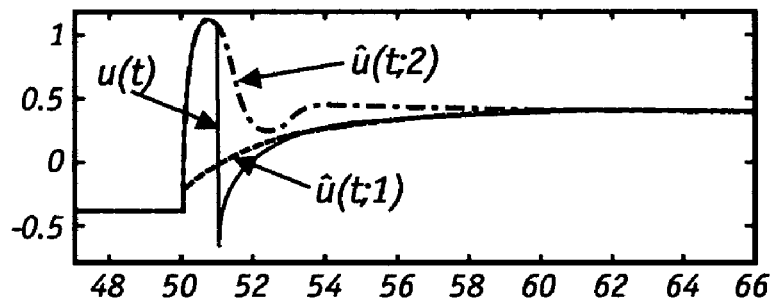
Figure 4C:
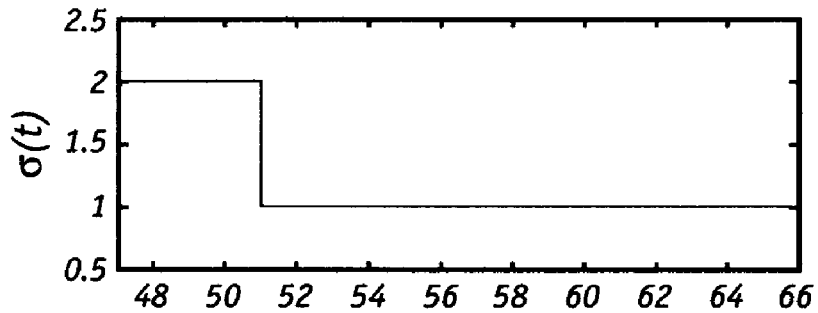
Figure 4D:
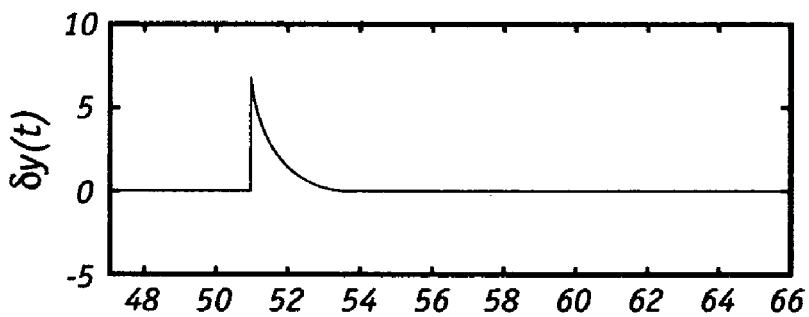
Figure 4E:
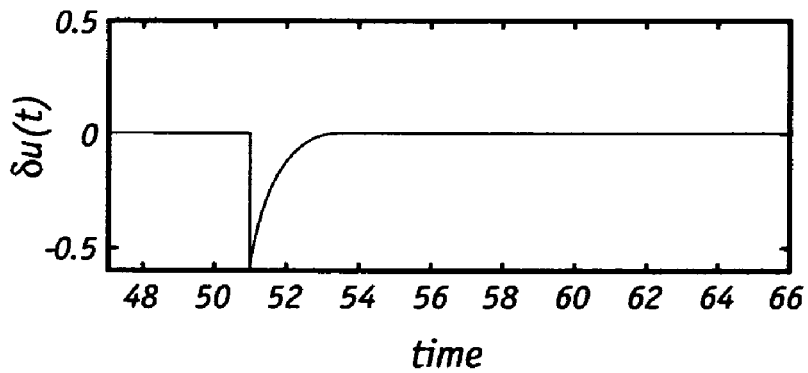

Thus, one embodiment of the control scheme as shown in FIG. 1B illustrates the configuration for switching between a family of controllers $K_p(s)$ for $p \in \{1, \ldots, m\}$ 202, 204 with the objective of controlling a stable linear time-invariant plant G 206 wherein $C_1 \ldots C_m$ in (4) is represented by a model G of the plant y(t) is the measured output signal 210 and d(t) is an additive output disturbance 212 at time t. The controller switching is performed with a memoryless nonlinear operator 214 that select one of the m possible control outputs $v_1(t), \ldots v_m(t)$ 222, 224 at each time t according to the exogenous switching signal $\sigma(t)$ 208 to select a signal $v_o(t)$ which is the 'online' control signal $u(t) = v_o(t)$ 218 at each time t which is used to control the plant. As shown, each sub-controller, 202, 204 is augmented by constructing an auxiliary signal that is the difference between the sub-controller's output 222, 224 and the online control signal 218, inputting that signal through a model of the plant, and adding the resulting signal to the input of the sub-controller.

2.3 Robust Stability

The analysis of closed-loop stability and performance in Sections 2.1 and 2.2 has relied upon perfect knowledge of the plant so that the control designer can set the internal model $\hat{G}$ in (6) equal to the plant G in (1). In practice perfect model knowledge does not exist and here the stability of the switched control system (1), (6), (7) with respect to practical model mismatch is analyzed, where it is known that the model lies within a neighborhood of the true plant $\|G(s) - \hat{G}(s)\|_{H_\infty} < \gamma$. The notation $\|\cdot\|_{H_\infty}$ denotes the standard $H_\infty$ norm of a linear time invariant transfer matrix. (See, K. Zhou, J. C. Doyle, and K. Glover. Robust and Optimal Control. Prentice Hall, New Jersey, 1996, for example.) This particular form is well known as additive model uncertainty in standard robust control of linear systems.

First two quantities that are relevant to the robust stability margins of the system are defined, $$\gamma_n := \max_{p \in \{1, \ldots, m\}} \|W(s)R_p(s)\|_{\mathcal{H}_\infty}, \tag{19}$$

$$\gamma_s := \|W(s)\|_{\mathcal{H}_\infty} \cdot \left\| \begin{bmatrix} R_1(s) \\ \vdots \\ R_m(s) \end{bmatrix} \right\|_{\mathcal{H}_\infty}$$

where it is straightforward to show that $\gamma_n \leq \gamma_s$. The following Theorem uses $\gamma_n$ and $\gamma_s$ to define lower and upper bounds on the allowable model uncertainty for which the closed-loop switched system in (1), (6), (7) will remain $L_2$-stable.

Theorem 4 (Robust Stability) Given stable linear transfer matrices $\hat{G}$, $R_p$ for $p \in \{1, \ldots, m\}$ in (6), and W in (7).
(a) If $$\gamma < \frac{1}{\gamma_s}$$

in (19) then the switched control system (1), (6), (7) is $L_2$-stable for arbitrary switching signal $\sigma(t)$ and any stable linear transfer matrix G in (1) that satisfies $\|G(S)-\hat{G}(s)\|_{H_\infty} < \gamma$.
(b) If $$\frac{1}{\gamma_n} < \gamma$$

in (19) then there exists a switching signal $\sigma(t)$ and a stable linear transfer matrix G in (1) with $\|G(S)-\hat{G}(s)\|_{H_\infty} < \gamma$ for which the switched control system (1), (6), (7) is $L_2$-unstable. Proof of Theorem 4 is provided herein.

Note that the transfer matrices W and $R_p$ for $p \in \{1, \ldots, m\}$ are selected by the designer of the controller in (6), (7). Since the lower and upper bounds on robust stability are a function of these transfer matrices in (19), then Theorem 4 shows that the designer is always able to achieve practical robust stability margins for the arbitrarily switched control system in (1), (6), (7). However the result in Theorem 4 does not provide any information about the $L_2$-stability of the switched control system for model uncertainty in the range $$\frac{1}{\gamma_s} \leq \gamma \leq \frac{1}{\gamma_n}.$$

It should be remarked that the robust stability conditions in Theorem 4 for the switched system (1), (6), (7) are closely related to results for robust control of unswitched linear systems. If the number of controller modes m=1 (therefore no switching occurs), then the result (a) is equivalent to the standard robust stability condition for linear systems. Further if the number of control modes m=1 and the condition number of the post-switch block k(W)=1 for all frequencies ω in (7), then we find $\gamma_n = \gamma_s$ in (19) and both (a) and (b) in Theorem 4 are equivalent to the linear systems result. (For example single-actuator control systems with scalar W(s) or multivariable control designs with no post-switch dynamics so that W(s)=I.

3. EXAMPLE

The properties of the switched controller scheme in (6), (7) with a numerical example are illustrated. The problem of switching between two single-input-single-output (SISO) proportional integral (PI) controllers are considered and show that the two degrees of freedom in (6), (7) permit a switched controller design in which the transient performance may be modified while the steady-state performance remains identical are considered. Due to the structure of the proposed controller in (6), (7), these designs are all guaranteed to lead to a closed-loop switched system that is nominally exponentially stable with arbitrary switching signal σ. The effect of the designs on the robust stability margins is also examined.

Consider the first order plant, $$g(s) = \frac{10}{s+1} \tag{20}$$

for which two PI controllers are constructed, $$k_1(s) = 0.02 + \frac{0.03}{s}, \quad k_2(s) = 0.06 + \frac{0.4}{s} \tag{21}$$

The controller $k_1(s)$ was designed to provide a conservative closed-loop and $k_2(s)$ is more aggressive. It can be confirmed that $k_1(s)$ and $k_2(s)$ each stabilizes the plant g(s) in (20) since (for a negative feedback loop) the associated Youla-Kucera parameters are, $$q_1(s) = \frac{k_1(s)}{1+g(s)k_1(s)} = \frac{0.02s^2 + 0.05s + 0.03}{s^2 + 1.2s + 0.3}, \tag{22}$$

$$q_2(s) = \frac{k_2(s)}{1+g(s)k_2(s)} = \frac{0.06s^2 + 0.46s + 0.4}{s^2 + 1.6s + 4}$$

The proposed configuration in (6), (7) can be used to design a switched controller that provides the same closed-loop performance as would each PI controller in steady-state (with respect to σ(t)) and is globally uniformly exponentially stable for arbitrary switching signal σ(t). These two requirements do not uniquely specify the configuration in (6), (7) and it will be demonstrated that the use of a remaining degree of freedom in changing the transient performance and robust stability properties of the closed-loop.

First the switched controller (6), (7) with an 'all-pass' post-switch filter is designed, $$w(s) = 1, \tag{23}$$

$$r_1(s) = \frac{0.02s^2 + 0.05s + 0.03}{s^2 + 1.2s + 0.3}$$

$$r_2(s) = \frac{0.06s^2 + 0.46s + 0.4}{s^2 + 1.6s + 4}$$

where it is evident that $r_1(s)$ and $r_2(s)$ in (23) are equivalent to the Youla-Kucera parameters in (22). FIGS. 2A to 2E illustrate the trajectories of the closed-loop system with plant in (20) and controller in (23) as the closed-loop is subjected to a step in setpoint and a switch in σ(t). Also included are the trajectories that would be achieved by controlling to the same setpoint with each of the linear controllers $k_1(s)$ and $k_2(s)$ in (21). In other words, the signals $\hat{y}(t; p)$ and $\hat{u}(t; p)$ that were defined in (15). For use in this example, the transient signals are defined as, $$\delta y(t)=y(t)-\hat{y}(t; \sigma), \delta u(t)=u(t)-\hat{u}(t; \sigma) \tag{24}$$

that allows us to illustrate the convergence of the online signals u, y to the unswitched signals $\hat{u}$, $\hat{y}$ in (15).

The second system is designed with a low-pass post-switch filter w(s). To maintain the PI controller structure, the pre-switch component of the Youla-Kucera parameter is augmented with the inverse of the filter, $$w(s) = \frac{s+1}{s+0.6}, \tag{25}$$

$$r_1(s) = \frac{0.02s^2 + 0.05s + 0.03}{s^2 + 1.2s + 0.3} \cdot \frac{s+0.6}{s+1}$$

$$r_2(s) = \frac{0.06s^2 + 0.46s + 0.4}{s^2 + 1.6s + 4} \cdot \frac{s+0.6}{s+1}$$

The third design incorporates a high-pass post-switch filter w(s) with the pre-switch parameter again augmented with the filter's inverse, $$w(s) = \frac{s+1}{s+2}, \tag{26}$$

$$r_1(s) = \frac{0.02s^2 + 0.05s + 0.03}{s^2 + 1.2s + 0.3} \cdot \frac{s+2}{s+1}$$

$$r_2(s) = \frac{0.06s^2 + 0.46s + 0.4}{s^2 + 1.6s + 4} \cdot \frac{s+2}{s+1}$$

Note that for each of the three controllers (23), (25), and (26) the post-switch filter w(s) has a direct feedthrough term, so it is expected that the online control signal u(t) to be discontinuous at the switching times of σ(t). (As discussed above, a bumpless transfer in u(t) would require a strictly proper w(s).)

Illustrative results for each of these three designs are plotted in FIGS. 2, 3, and 4. FIGS. 2A to 2E illustrate the operations of switched PI controllers with all-pass post-switch filter w(s)=1 in (7) following a step in reference r(t) from −4 to +4 at t=50s and controller mode switching σ(t) from 2 to 1 at t=51s. FIGS. 3A to 3E illustrate the operations of switched PI controllers with low-pass post-switch filter w(s)=(s+1)/(s+ 0.6) in (7) following a step in reference r(t) from −4 to +4 at t=50s and controller mode switching σ(t) from 2 to 1 at t=51s. FIGS. 4A to 4E illustrate the operations of switched PI controllers with high-pass post-switch filter w(s)=(s+1)/(s+2) in (7) following a step in reference r(t) from −4 to +4 at t=50s and controller mode switching σ(t) from 2 to 1 at t=51s.

An interesting feature of designs such as (23) that have w(s)=1 can be observed as the online control signal u(t) switches immediately from $\hat{u}(t; 2)$ to $\hat{u}(t; 1)$ when σ(t) switches from 2 to 1 at time t=51s. The transient signal δu(t)=0 at all times t>0 in this situation. Thus the transient signal δy decays exponentially according to the dynamics of the plant G in (20).

From FIGS. 3A to 3E it can be observed that the low-pass w(s) in (25) has led to a slower switching as it takes longer for u(t)→$\hat{u}$(t; 1) following the switch, and thus the signal δy decays at a rate slower than the open-loop dynamics of the plant G in (20). Finally the aggressive design in (26) is plotted in FIGS. 4A to 4E, where the signal u(t) takes an unusual trajectory. Following the switch, the signal u(t) overshoots its new trajectory before settling in to $\hat{u}$(t; 1). This overshoot has the effect of accelerating the decay of δy faster than the open-loop dynamics of the plant G in (20).

These transient switching performance results for each of the three switched controlled designs are collected quantitatively in Table 1 along with parameters related to the upper and lower bounds on the robust stability margins discussed in Section 2.3 above. In general the difference between the lower and upper bounds $\gamma_n$ and $\gamma_s$ is determined by the relations in (19). It is apparent that the lower and upper bounds can be quite tight in practice and differ by less than 1% for the design in (23).

TABLE 1

| Controller | $1/\gamma_s$ | $1/\gamma_n$ | ∫|δy(t)|dt | ∫|δu(t)|dt |
|---|---|---|---|---|
| Eq. (23) | 3.4097 | 3.4227 | 6.8498 | 0 |
| Eq. (25) | 2.1970 | 3.4227 | 11.4163 | 0.4567 |
| Eq. (26) | 2.6558 | 3.4227 | 3.4249 | 0.3425 |

Proof of Theorem 2

Prove the existence of a matrix $\tilde{P}=\tilde{P}^T>0$ that satisfies (14) by explicitly constructing such a matrix.

Consider the matrix $\tilde{P}=\text{diag}\{c_1 P_1, \ldots, c_n P_n\}$ where each sub-matrix is designed such that $P_j=P_j^T>0$ and $$-A_{jj}^T P_j - P_j A_{jj} > \epsilon \tag{A.1}$$

which is possible since each $A_{jj}$ is stable for j=1, ..., n. It will be shown that it is always possible to select the scalars $c_j>0$ sufficiently large such that all leading principal minors of $M_p = -\tilde{A}_p^T \tilde{P} - \tilde{P}\tilde{A}_p$ are positive for all p and thus each $M_p$ is positive definite.

$$-\tilde{A}_p^T \tilde{P} - \tilde{P}\tilde{A}_p = \tag{A.2}$$

$$-\begin{bmatrix} c_1(A_{11}^T P_1 + P_1 A_{11}) & c_1 P_1 A_{12}(p) & \cdots & c_1 P_1 A_{1n}(p) \\ c_1 A_{12}(p)^T P_1 & c_2(A_{22}^T P_2 + P_2 A_{22}) & \cdots & c_2 P_2 A_{2n}(p) \\ \vdots & \vdots & \ddots & \vdots \\ c_1 A_{1n}(p)^T P_1 & c_2 A_{2n}(p)^T P_2 & \cdots & c_n(A_{nn}^T P_n + P_n A_{nn}) \end{bmatrix}$$

Now introduce the orthogonal matrices $V_j^{-1}=V_j^T$ such that each $D_j=-V_j(A_{jj}^T P_j+P_j A_{jj})V_j^T$ is a diagonal matrix for j=1, ..., n. Note that each element of $D_j$ is larger than ε by reason of (A.1). Writing $\tilde{V}=\text{diag}\{V_1, \ldots, V_n\}$ $$\tilde{V}(-\tilde{A}_p^T \tilde{P} - \tilde{P}\tilde{A}_p)\tilde{V}^T = \tag{A.3}$$

$$\begin{bmatrix} c_1 D_1 & c_1 V_1(P_1 A_{12}(p))V_2^T & \cdots & -c_1 V_1(P_1 A_{1n}(p))V_n^T \\ -c_1 V_2(A_{12}(p)^T P_1)V_1^T & c_2 D_2 & \cdots & -c_2 V_2(P_2 A_{2n}(p))V_n^T \\ \vdots & \vdots & \ddots & \vdots \\ -c_1 V_n(A_{1n}(p)^T P_1)V_1^T & -c_2 V_n(A_{2n}(p)^T P_2)V_2^T & \cdots & c_n D_n \end{bmatrix}$$

Note that the eigenvalues of the RHS of (A.3) are equivalent to the eigen values of the RHS of (A.2).

To show that all of the leading principal minors of (A.3) are positive, start with an arbitrary $c_1>0$, then all of the leading principal minors of the diagonal matrix $c_1D_1$ are positive. Now suppose that $c_1, \ldots, c_{k-1} > 0$ have been chosen such that all leading principal minors associated with the first k−1 blocks of (A.3) are positive.

Then the leading principal minors associated with the $k^{th}$ block of (A.3) can be computed from a matrix of the form, $$L_k(p) = \begin{bmatrix} L_{k-1}(p) & F_{k-1}(p) \\ F_{k-1}(p)^T & c_k D_k \end{bmatrix} \quad (A.4)$$

where $L_1(p) = L_1 = c_1 D_1$ and $$F_{k-1}(p)^T = -[c_1 V_k A_{1,k}(p)^T P_1 V_1^T, \ldots, c_{k-1} V_k A_{k-1,k}(p)^T P_{k-1} V_{k-1}^T] \quad (A.5)$$

Note that the matrices $L_{k-1}(p)$ and $F_{k-1}(p)$ do not depend on the constant $c_k$ and matrix $D_k$ does not depend on the index p. In (A.4) only the last $n_k$ leading principal minors are of interest as all leading principal minors of $L_{k-1}$ are assumed to be positive. It is straightforward to show that the last $n_k$ leading principal minors of (A.4) are given by polynomials in $c_k$, $$f_j(p; c_k) = \sum_{i=0}^{j} a_{ij}(p) c_k^i \quad (A.6)$$

where the symbols $a_{ij}(p)$ denote scalars indicating the $i^{th}$ coefficient of the $j^{th}$ polynomial in $c_k$ that corresponds to the $j^{th}$ leading principal minor. If the previous principal minors are all positive, then the leading coefficient $a_{jj}(p) > 0$ in (A.6) for $j = 1, \ldots, n_k$ and $p = 1, \ldots, m$, and one can always select $c_k > 0$ large enough such that each $f_j(p; c_k) > 0$ in (A.6). Since $f_j(p; c_k)$ is $j^{th}$ order polynomial, any $$c_k > \frac{1}{|a_{jj}(p)|} \sum_{i=1}^{j} |a_{ij}(p)|, \quad \forall j = 1, \ldots, n_k \quad (A.7)$$

for all $p \in \{1, \ldots, m\}$ will suffice.

Then starting with $k = 1$ one can design each $c_k$ in this fashion for $k = 1, \ldots, n$. Thus every leading principal minor of the RHS of (A.2) is positive meaning that $-\tilde{A}_p^T P - P \tilde{A}_p > 0$ for all $p \in \{1, \ldots, m\}$. This completes the proof.

Proof of Theorem 4

(a) The closed-loop system defined by (1), (6), (7) is given by, $$V(t) := \begin{bmatrix} v_1(t) \\ \vdots \\ v_m(t) \end{bmatrix} = \begin{bmatrix} R_1 \\ \vdots \\ R_m \end{bmatrix} \cdot [(G - \hat{G})u(t) + d(t)] \quad (B.1)$$

$$v_\sigma(t) = L(V(t); \sigma(t)) \quad (B.2)$$

$$u(t) = W \cdot v_\sigma(t) \quad (B.3)$$

where L in (B.2) denotes a memoryless nonlinear operator, $$L([x_1^T, x_2^T, \ldots, x_m^T]^T; j) = x_j, \quad j \in \{1, \ldots, m\} \quad (B.4)$$

which performs the controller switching.

In order to evaluate the stability of the system in (B.1)-(B.3) one can apply the small gain theorem and determine the worst case induced $L_2$-gain of the loop. Moving around the loop, the $L_2$-gain is less than one if the product of the induced $L_2$-norm of each of the components is smaller than one, $$\gamma_w \gamma_l \gamma_r \gamma_\Delta < 1 \quad (B.5)$$

where $\gamma_w$ refers to the induced $L_2$-norm of W in (B.3), similarly $\gamma_l$ refers to L in (B.2) and (B.4), $\gamma_r$ to $[R_1^T, \ldots, R_m^T]^T$ and $\gamma_\Delta$ to the model mismatch $\Delta = G - \hat{G}$ respectively in (B.1).

The induced $L_2$-norms of the three linear time invariant components in (B.5) are simply the $H_\infty$ norms. The norms of the controller components are, $$\gamma_w = \|W(s)\|_{H_\infty}, \quad \gamma_r = \left\| \begin{bmatrix} R_1(s) \\ \vdots \\ R_m(s) \end{bmatrix} \right\|_{H_\infty} \quad (B.6)$$

and the model mismatch term is assumed to be, $$\gamma_\Delta = \|G(s) - \hat{G}(s)\|_{H_\infty} < \gamma \quad (B.7)$$

The nonlinear switch component L in (B.2) is said to have an $L_2$-gain less than or equal to $\gamma_l$ if $$\int_0^T \|v_\sigma(t)\|^2 dt \leq \gamma_l^2 \int_0^T \|V(t)\|^2 dt \quad (B.8)$$

for all $T < 0$, $V \in L_2$, and all switching signal $\sigma(t)$.

Since $V \in L_2$ then the individual signals comprising V each have $v_p \in L_2$ for $p \in \{1, \ldots, m\}$ and the output signal of L has a norm, $$\|v_\sigma\|_{L_2}^2 = \int_0^\infty |v_\sigma(t)|^2 dt \leq \int_0^\infty \|v_{\sigma*}(t)\|^2 dt, \quad (B.9)$$

$$\left(\text{for } \sigma*(t) = \arg \max_{p \in \{1, \ldots, m\}} \|v_p(t)\|^2\right)$$

$$\leq \int_0^\infty \|v_1(t)\|^2 dt + \ldots + \int_0^\infty \|v_m(t)\|^2 dt \quad (B.10)$$

$$= \int_0^\infty \left\| \begin{bmatrix} u_1(t) \\ \vdots \\ v_m(t) \end{bmatrix} \right\|^2 dt = \left\| \begin{bmatrix} v_1(t) \\ \vdots \\ v_m(t) \end{bmatrix} \right\|_{L_2}^2 = \|V(t)\|_{L_2}^2 \quad (B.11)$$

then since the last term in (B.11) is the input signal to L this leads to a bound on the induced norm for the nonlinear switch element L in (B.2), $$\gamma_l \leq 1 \quad (B.12)$$

Then collecting (B.6), (B.7), and (B.12) we see that (B.5) may be satisfied (and thus the switched system (1), (6), (7) is $L_2$-stable) by choosing $(\gamma_w \gamma_r)^{-} > \gamma_\Delta$, and noting that $\gamma_s = \gamma_w \gamma_r$ in (19), this completes the proof.

(b) The constant switching case with $\sigma(t) = p$, results in a linear time invariant L in (B.2) and thus (1), (6), (7) reduces to a linear system for which $\gamma_n < \gamma$ is well known to be a tight condition for robust stability. This completes the proof.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A switched control system, which is suitable for controlling a plant, comprising:
    a plurality of sub-controllers wherein each sub-controller can individually stabilize the plant and wherein the plurality of sub-controllers is implemented in parallel and continuously wherein each sub-controller generates an output control signal such that arbitrary switching between each of the plurality of sub-controllers is permitted; and
    means for switching between the plurality of sub-controllers to connect one of the sub-controllers to be online and thereby control the plant and wherein the switched control system is closed-loop stable under arbitrary switching and the means for switching between the plurality of sub-controllers selects an output control signal from one of the sub-controllers to control the plant.

2. The switched control system of claim 1 wherein the plant is a linear time invariant plant and each of the sub-controllers is a stabilizing output feedback linear time invariant controller.

3. A method of operating a switched control system, which is stable for arbitrary switching signals and which includes a plurality of sub-controllers for controlling a plant by switching between the plurality of sub-controllers in response to an arbitrary signal, said method comprising the steps of:
    (a) providing a plurality of sub-controllers each of which can individually stabilize the plant;
    (b) factoring each of the sub-controllers into two or more blocks;
    (c) implementing the plurality of sub-controllers in terms of the two or more blocks, in parallel and continuously wherein each sub-controller generates an output control signal such that arbitrary switching between each of the plurality of sub-controllers is permitted; and
    (d) selecting an output control signal from one of the sub-controllers to control the plant.

4. The method of claim 3 wherein step (b) comprises factoring each of the sub-controllers into an internal model and a stable Youla-Kucera parameter.

5. The method of claim 3 wherein in step (c) an online control signal is fed into the sub-controller through an internal model of the plant.

6. The method of claim 3 further comprising the step of augmenting the Youla-Kucera parameter with stable post-switch linear time invariant transfer matrix.

7. The method of claim 3 wherein step (c) comprises generating a plurality of controller outputs signals and step (e) comprises of connecting one of the output signals to a post-switch block which outputs an online control signal to control the plant.

8. The method of claim 3 wherein step (e) comprises of selecting a control signal in response to an exogenous switching signal.

9. The method of claim 3 wherein the plant is a linear time invariant plant and each of the sub-controllers is a stabilizing output feedback linear time invariant controller.

10. The method of claim 3 wherein in step (c) closed-loop transients induced by switching between the sub-controllers are quantified and in step (e) the effect of the closed-loop transients is a factor in selecting the output control signal from one of the sub-controllers to control the plant.

11. A system suitable for controlling a plant which includes a plurality of sub-controllers each of which can individually stabilize the plant wherein each of the sub-controllers are factored into two or more blocks, said system being configured to perform the steps of:
    (a) implementing the plurality of sub-controllers in parallel and continuously wherein each sub-controller generates an output control signal such that arbitrary switching between catch of the plurality of sub-controllers is permitted; and
    (b) selecting an output control signal from one of the sub-controllers to control the plant.

12. The system of claim 11 wherein each sub-controller is factored into an internal model of the plant and a stable Youla-Kucera parameter.

13. The system of claim 12 wherein in step (a) an online control signal is fed into the sub-controller through an internal model.

14. The system of claim 12 further comprising the step of augmenting the Youla-Kucera parameter with stable post-switch linear time invariant transfer matrix.

15. The system of claim 11 wherein the plant is represented by a model and wherein, for each sub-controller, the model uses a signal that is proportional to the difference between the sub-controller's output signal and an online control signal to generate an auxiliary signal that is connected to the sub-controller.

16. The system of claim 11 wherein step (a) comprises generating a plurality of controller outputs signals and step (b) comprises of connecting one of the outputs to a post-switch block which outputs an online control signal to control the plant.

17. The system of claim 11 wherein step (b) comprises of selecting an output control signal in response to a switching signal.

18. The system of claim 11 wherein the plant is a linear time invariant plant and each of the sub-controllers is a stabilizing output feedback linear time invariant controller.

19. The system of claim 11 wherein in step (a) closed-loop transients induced by switching between the sub-controllers are quantified and in step (b) the effect of the closed-loop transients is a factor in selecting the output control signal from one of the sub-controllers to control the plant.

* * * * *